Oct. 10, 1961 E. J. GARGINI 3,004,098

COLOUR TELEVISION RECEIVERS

Filed Feb. 26, 1958 2 Sheets-Sheet 1

Inventor
E. J. Gargini
By Glascock Downing & Seebold
Attys.

Oct. 10, 1961 E. J. GARGINI 3,004,098

COLOUR TELEVISION RECEIVERS

Filed Feb. 26, 1958 2 Sheets-Sheet 2

Inventor
E. J. Gargini
By Glascock Downing & Seebold
Attys.

3,004,098

COLOUR TELEVISION RECEIVERS

Eric John Gargini, West Drayton, England, assignor to Electric & Musical Industries Limited, Hayes, Middlesex, England, a company of Great Britain Filed Feb. 26, 1958, Ser. No. 717,728
Claims priority, application Great Britain Feb. 27, 1957
7 Claims. (Cl. 178—5.4)

Figure 1:
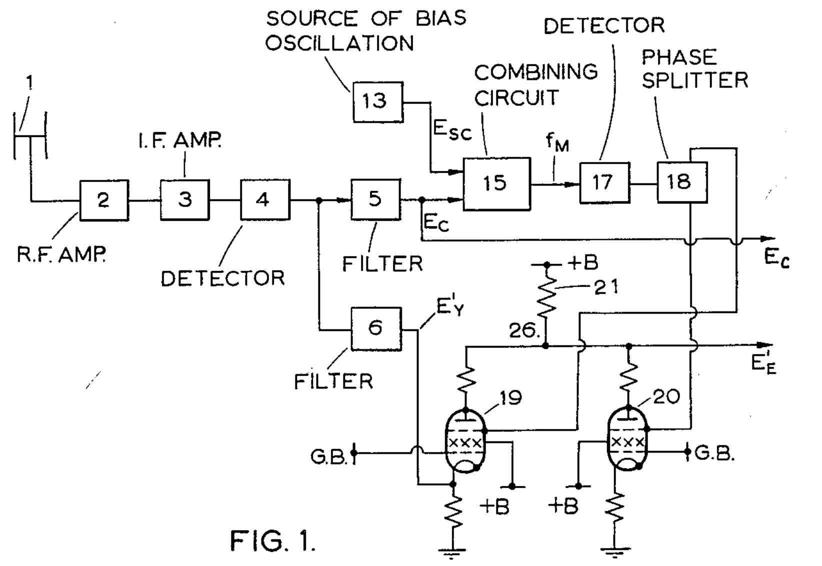

This invention relates to colour television apparatus and especially though not exclusively to colour television receivers.

In the specifications of co-pending United States patent applications Nos. 672,458 and 702,627, now Patent No. 2,966,544, there is described a colour television receiver in which the cathode ray image reproducing tube has a fluorescent screen which comprises an array of parallel phosphor strips transverse to the line scanning direction and emitting different colours when excited by the cathode ray. Colour variations in a reproduced picture are moreover produced by modulating the velocity of the beam in the line scanning direction, the modulation being effected, preferably, by a sawtooth waveform of relatively high frequency corresponding to the frequency with which the beam traverses the groups of the phosphor strips. The sawtooth waveform is moreover modulated in phase to represent the hue of the signals to be reproduced and is modulated in amplitude to represent the saturation of the respective hue. Moreover the beam of the cathode ray tube is modulated in intensity in dependence upon the received luminance information.

In a colour television receiver of this construction, it is desirable that the luminance signal, employed to modulate the beam intensity, should be an equal energy luminance signal, such a luminance signal being represented for example by $$E_E' = (0.33R + 0.33G + 0.33B)^{\frac{1}{\gamma}}$$

It has, however, been proposed to transmit a luminance signal which is preferable for the reproduction of monochrome pictures, and maintains constant luminance operation in the colour channel, such a luminance signal being represented by $$E_Y' = (0.30R + 0.59G + 0.11B)^{\frac{1}{\gamma}}$$

In a colour television receiver, it is always feasible, by a process of matrixing to reform individual colour component signals from the received signals and to recombine them in appropriate ratios to produce a signal of the form $E_E'$. This however tends to be a complicated process and demands elaborate circuits, especially having regard to allowance which must be made for gamma correction of the signals.

The main object of the present invention is to enable conversion of a signal of the form $E_Y'$ into a signal of the form $E_E'$ to be effected by means of a relatively simple circuit. The present invention, however, also aims more generally at facilitating the conversions of a brightness signal of one type into a brightness signal of another type.

According to the present invention there is provided, in colour television apparatus where there is available a signal indicative of the colour of successive image points, a device for converting a brightness signal of one type into a brightness signal of another type, said device comprising means for amplifying the brightness signal of the first type with a gain which is variable in response to a signal derived by mixing said colour signal with an oscillation of reference phase.

Figure 4:
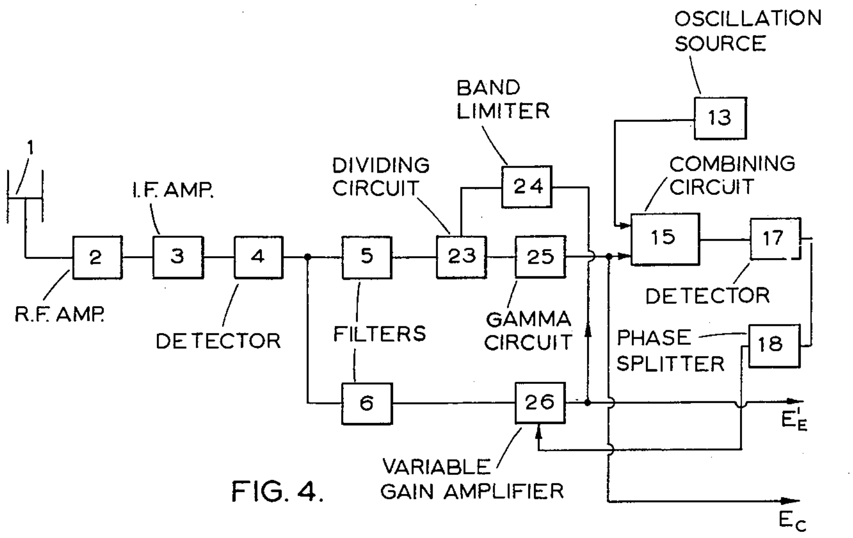
Figure 2:
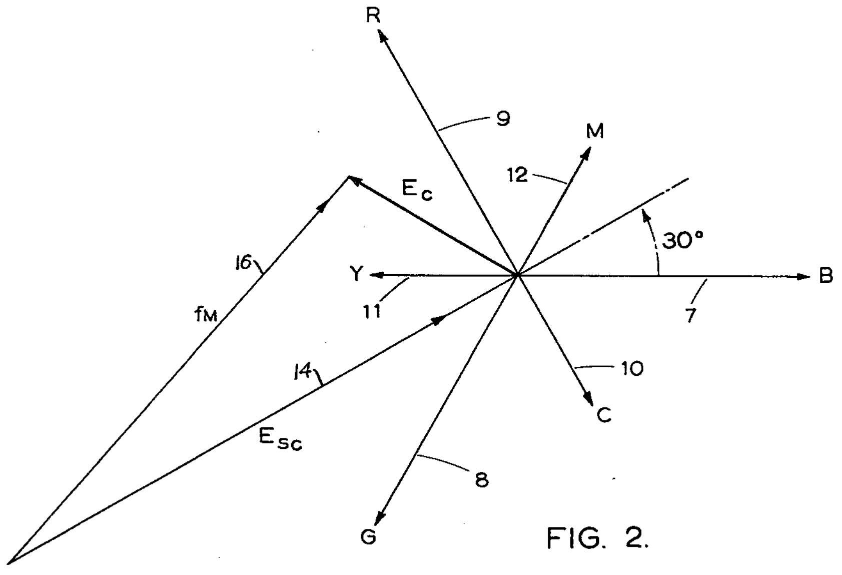
Figure 3:
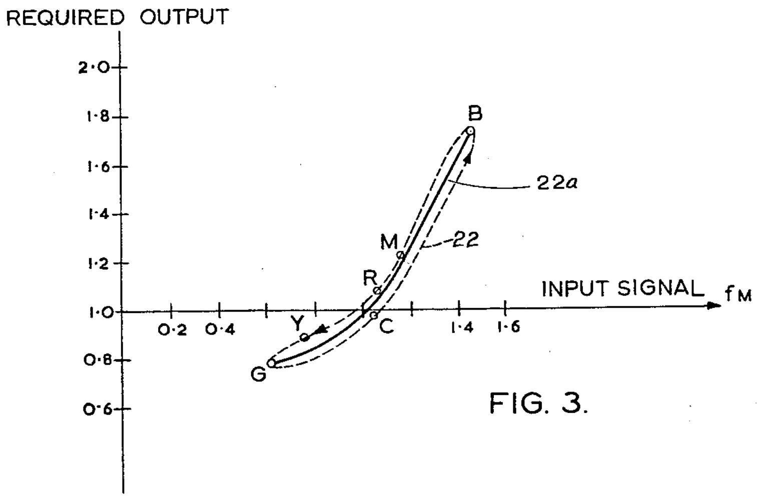

In order that the present invention may be clearly understood and readily carried into effect, the invention will be described with reference to the accompanying drawings in which:

FIGURE 1 illustrates in block form part of a television receiver embodying a device according to the invention for converting a signal of the form $E_Y'$ into a signal of the form $E_E'$, FIGURE 2 is a vector diagram explanatory of the operation of FIGURE 1, FIGURE 3 is a graph which will be used in describing the operation of FIGURE 1, and FIGURE 4 illustrates a modification of FIGURE 1 in which the conversion device is adapted for use with a colour signal having a different composition from that used in the device illustrated in FIGURE 1.

Referring to the drawing, it will be assumed that the receiver, part of which is illustrated in FIGURE 1, is arranged for the reception of broadcast carrier waves modulated with colour television signals which are defined by the relationship $$E_M^{\left(\frac{1}{\gamma}\right)} = E_Y' + E_C$$

where $$E_Y' = (0.59E_G + 0.30E_R + 0.11E_B)^{\frac{1}{\gamma}}$$

$$E_C\text{ (ratio)} = \frac{E_R}{E_E}\cos\omega t + \frac{E_B}{E_E}\cos\left(\omega t \pm \frac{2\pi}{3}\right) + \frac{E_G}{E_E}\cos\left(\omega t \pm \frac{4\pi}{3}\right)$$

and $$E_E = \frac{E_R + E_B + E_G}{3}$$

The signal $E_C$ (ratio) represents a modulated carrier wave of frequency $$\frac{\omega}{2\pi}$$

and corresponds to the usual subsidiary carrier wave on which colour information is transmitted, being itself transmitted as modulation of the main carrier wave. The frequency $$\frac{\omega}{2\pi}$$

may be within the range of frequencies of $E_Y'$ or without this range as desired.

In the foregoing relationships, the components $E_R$, $E_G$ and $E_B$ have their usual significances. The conversion device to be described converts the signals $E_Y'$ into a signal $E_E'$ as hereinbefore defined and for an image element which is white, it is clear that $$E_Y' \equiv E_E'$$

In amplifying the signal $E_Y'$ in the conversion device the gain of the amplifier can be taken to represent unity for white. Using this gain as a reference it can then be shown that the gain of the amplifier should vary as shown in the following list when the $E_Y$ signal corresponds to an element of the colour indicated.

| Colour: | Required gain |
|---|---|
| White | 1 |
| Cyan | 0.98 |
| Green | 0.62 |
| Yellow | 0.87 |
| Red | 1.05 |
| Magenta | 1.27 |
| Blue | 1.73 |

In evaluating these gains the exponents $$\frac{1}{\gamma}$$

of the signal $E_Y'$ and $E_B'$ is taken into account. For colours intermediate those indicated, corresponding gains are required.

The carrier wave signal received by the aerial 1 is applied to a radio frequecy amplifying and frequency changing stage 2 and thence, as the intermediate frequency signal, is applied to the intermediate frequency amplifier 3 which is followed by the usual detector 4. The sound signals may be extracted in the intermediate frequency amplifier in conventional manner. The signal appearing at the output of the detector 4 is a signal of the form $$E_M^{\left(\frac{1}{\gamma}\right)}$$

as above defined and it is applied to filters 5 and 6. The high pass filter 5 extracts the subsidiary carrier wave which is modulated with the colour signal $E_C$(ratio) whilst the filter 6 extracts the signal $E_Y'$. The signal $E_C$(ratio) may be regarded as a vector of which the magnitude is represented by the amplitude of the subsidiary carrier wave and of the which direction is represented by the phase of the subsidiary carrier wave. On this basis the vectors 7, 8 and 9 in FIGURE 2 represent the signal $E_C$(ratio) corresponding to saturated blue, saturated green and saturated red respectively. Similarly the vectors 10, 11 and 12 represent the signal $E_C$(ratio) corresponding to maximally saturated cyan, yellow and magental. Thus the signal $E_C$(ratio) is a chromaticity or ratio signal and its phase angle referred to some suitable datum represents the hue of successive picture elements, of which the luminance is represented by the corresponding value of $E_Y'$; similarly its amplitude represents the saturation of the respective hue, the amplitude being zero for white.

In FIGURE 1, the rectangle 13 represents the source of an oscillation of reference phase and amplitude, the "colour burst" oscillation which is usually transmitted with colour television signals. Similarly, its amplitude may be fixed with reference to the maximum amplitude of the signal $E_C$(ratio). This oscillation, denoted by $E_{SC}$ and termed a biassing oscillation, is represented by the vector 14 in FIGURE 2, and it is added to the signal $E_C$(ratio) in a combining circuit 15 which may be of any suitable construction. As indictaed in FIGURE 2 the phase and amplitude of the biassing oscillation $E_{SC}$ is such that the corresponding vector has a magnitude of approximately twice the magnitude of the vectors 7, 8 and 9 and a direction 30° taking the vector 7 as the initial line. The output of the combining circuit is the resultant 16, denoted in general by $f_M$, of the vectors $E_C$(ratio) and $E_{SC}$, and it can be shown that the amplitude of $f_M$ when $E_C$(ratio) denotes saturated colours (hues) as specified in the above list is as follows (taking the amplitude for white as unity)

| Colour: | Amplitude of $f_M$ |
|---|---|
| White | 1 |
| Cyan | 1.03 |
| Green | 0.62 |
| Yellow | 0.78 |
| Red | 1.10 |
| Magenta | 1.21 |
| Blue | 1.45 |

The amplitude of $f_M$ is detected by a detector 17, the phase angle of the resultant oscillation being no longer significant. The output of the detector which is a unidirectional signal $|f_M|$ of magnitude representing the amplitude of the oscillation $f_M$ is then applied to a phase splitting amplifier 18. The signal of one polarity in the output of the amplifier 18 is applied to the outer electrode of a pentode valve 19 and the signal of opposite polarity in the output of the amplifier 18 is applied to the outer electrode of another pentode valve 20. The valves 19 and 20 have a common anode load resistor 21 and the signal $E_Y'$ is fed to the cathode of the valve 19, the control electrode of that valve being connected to a suitable bias source. In the valve 19, the signal $|f_M|$ is multiplied by the signal $$E_Y^{\frac{1}{\gamma}}$$

and comparing the amplitude of $f_M$ with the values of gain required to effect a conversion from $E_Y'$ to $E_B'$ it can be shown that if the multiplication is linear, the error introduced in the conversion would be approximately as represented by the dotted graph 22 in FIGURE 3. However the valve 19 is chosen to have a gain characteristic at one of its control electrodes which is non-linear in a manner similar to the graph 22. The gain characteristic of the valves 19 and 20 may be as represented by the curve 22*a*, valves having such non-linear characteristics being readily available commercially. By a suitable choice of valve it is in fact possible to reduce the error in the conversion to a small value, say within ±2%. The valve 20 is used in known manner to cancel the signal $|f_M|$ which would otherwise appear across the resistor 21. The output signal across the resistor 21 therefore represents the desired brightness signal $E_B'$ to a very close approximation. In conjunction with the signal $E_C$(ratio) it can be employed to reproduce colour television signals in a receiver of the kind described in the aforesaid specifications.

The arrangement illustrated in FIGURE 4 is modified compared with FIGURE 1 to enable the conversion to be effected on the basis of a colour signal which is a chrominance signal of the N.T.S.C. type. Such a colour signal is formed by the addition of two phases in quadrature of a carrier wave of frequency $$\frac{\omega}{2\pi}$$

the two phases being modulated respectively with colour difference signals $$E_R^{\frac{1}{\gamma}} - E_Y^{\left(\frac{1}{\gamma}\right)} \text{ and } E_B^{\frac{1}{\gamma}} - E_Y^{\left(\frac{1}{\gamma}\right)}$$

In these expressions $$E_Y^{\left(\frac{1}{\gamma}\right)} = 0.59 E_G^{\frac{1}{\gamma}} + 0.30 E_R^{\frac{1}{\gamma}} + 0.11 E_B^{\frac{1}{\gamma}}$$

It is known that such a colour signal is approximately though not exactly equivalent to a colour signal of the form $$E_C' = E_R^{\frac{1}{\gamma}} \cos \omega t + E_B^{\frac{1}{\gamma}} \cos\left(\omega t \pm \frac{2\pi}{3}\right) + E_G^{\frac{1}{\gamma}} \cos\left(\omega t \pm \frac{4\pi}{3}\right)$$

Components in FIGURES 1 and 4 which correspond to each other bear the same reference numerals and it will be appreciated therefore that while the output of the filter 6 of FIGURE 3 is $E_Y'$ as in FIGURE 1 the output of the filter 5 is a colour signal of the form $E_C'$ indicated above. This signal is applied to a dividing circuit 23 in which it is divided by the output signal $E_B'$ of the conversion device, in order to produce a ratio signal, the output signal $E_B'$ being however reduced in bandwidth by the filter 24, before application to the circuit 23, so as to correspond to the bandwith of the sigani $E_C'$. The ratio signal produced by the circuit 23, as distinct from the signal $E_C$(ratio) of FIGURE 1, is gamma corrected and to remove the gamma correction, it is passed to a gamma circuit 25 which is such as to raise the applied signal to the power gamma so that the output of the circuit 25 is a ratio signal which is approximately the same as a ratio signal $E_C$(ratio) of FIGURE 1. This is the signal which is applied to the combining circuit 15 in which there is added to it the biased oscillation $E_{SC}$. The output of the combining circuit 15, after passing through the detector circuit 17 and the phase splitting amplifier 18, is used as a gain control signal in an amplifier 26 which corresponds to the amplifier in FIGURE 1 which comprises the valves 19 and 20. The output of the amplifier 26 is therefore the desired brightness signal $E_E'$ and it is this signal which is fed back via the filter 24 to the dividing circuit 23 to form the ratio signal.

If a band limiting filter is used as in FIGURE 4, there will inevitably be some delay in the feedback path. Corresponding delay must therefore be imparted to the colour signal $E_C'$ before the dividing circuit, and the signal $E_E'$ must also be delayed by the same amount as the colour signal.

The arrangement shown in FIGURE 4 can also be used if the received brightness signal is of the form $$E_Y^{\left(\frac{1}{\gamma}\right)}$$

being in that case composed of colour component signals which are individually gamma corrected before being combined, as indicated above. In such a case the conversion is rather less accurate than in the other cases discussed, though the loss of accuracy occurs mainly near saturated colours and is small for white or near white. The inaccuracy can however be reduced by using a somewhat different biassing oscillation $E_{SC}$ or by modifying the power to which the applied signal is raised in the gamma circuit 25.

In all forms of the invention, any inaccuracy which may arise though in general small, may be reduced if desired by deriving the gain control signal in two stages. For example, the gain control signal derived from the detector 17 of FIGURE 1 may be used to control the gain of an amplifier in which the signal $E_C$ is amplified. The modified signal $E_C$ can then be combined with another bias oscillation to produce the gain control signal $|f_M|$, for the signal $E_Y'$. In this modification of the invention the biassing oscillation used in both stages may differ in amplitude and phase from the oscillation $f_M$.

The biassing oscillation, even with a single stage circuit, may differ in amplitude and phase from the oscillation $f_M$ of FIGURE 1. Other values of amplitude phase may be selected to reduce the errors for some particular colours, at the cost for example of greater errors at other colours. Other considerations, such as receiver phosphor characteristics may affect the choice of the biassing oscillation $E_{SC}$. The variable gain amplifier need not be of the construction shown in FIGURE 1. For example the gain controlled amplifier can be an intermediate frequency amplifier in which case the valve 20 is unnecessary. Alternatively the signal $f_M$, before detection can be used as the gain control signal switching the amplifier intermittently to the conducting state, the gating frequency component being removed by a suitable filter.

What I claim is:

1. Colour television apparatus comprising an initial circuit for supplying a brightness signal which varies in amplitude as a function of the brightness of successive points of an image and a colour signal which varies in phase as a function of the hue of said image points and which varies in amplitude as a function of the intensity of the respective hue, a source of an oscillation of reference phase, means for adding said colour signal to the oscillation from said source to derive a biassing oscillation which varies in amplitude as a different function of the intensity of the respective hue, and means for variably amplifying said brightness signal with a gain which is variable in response to said biassing oscillation to modify said brightness signal.

2. Apparatus according to claim 1, said initial circuit being predetermined to supply a colour signal comprising an oscillation of which the phase represents the hue of successive image points and of which the amplitude represents the colour saturation thereof, and said oscillation source comprising an oscillator, means for deriving a reference oscillation from the signals supplied by said initial circuit, means for comparing oscillations from said oscillator with oscillations from said deriving means to produce an output signal representing the disconformity between the oscillations applied to said comparing means, and means responsive to the output signal of said comparing means for controlling said oscillator to cause said oscillator to produce, as said oscillation of reference phase, an oscillation of substantially constant phase and amplitude and of the same frequency as the centre frequency of said colour signal.

3. Apparatus according to claim 2, said initial circuit including means for deriving a signal from said modified brightness signal, and means for dividing a received colour signal by said signal derived from the modified brightness signal, thereby to supply said first mentioned colour signal, for interaction with said oscillation of reference phase.

4. Apparatus according to claim 3, said initial circuit including a power law circuit after said dividing means for compensating for gamma correction imparted to signals prior to said iniital circuit.

5. Apparatus according to claim 3, said means for deriving a signal from said modified brightness signal comprising a filter for limiting the band width of said modified signal to correspond to the band width of the received colour signal.

6. Apparatus according to claim 1, said initial circuit comprising a source of another oscillation of reference phase, means for adding a received colour signal to said other oscillation of reference phase to derive another biassing oscillation, means for variably amplifying said received colour signal with a gain responsive to said other biassing oscillation thereby to supply said first mentioned colour signal for interaction with said first mentioned oscillation of reference phase.

7. Colour television apparatus comprising an initial circuit for supplying a brightness signal of which the amplitude represents the luminance of successive points of an image and a colour signal of which the phase represents the hue of said image points and of which the amplitude represents the colour saturation thereof, a source of an oscillation of reference phase, means for adding said colour signal to said oscillation of reference phase to derive a biassing oscillation, and means having a non-linear gain characteristic for variably amplifying said brightness signal with a gain which is variable in response to said biassing oscillation to derive a modified brightness signal, said source of said reference oscillation comprising an oscillator, means for deriving a reference oscillation from the signals supplied by said initial circuit, means for comparing oscillations from said oscillator with oscillations from said deriving means to produce an output signal representing the disconformity between the oscillations applied to said comparing means, and means responsive to the output signal of said comparing means for controlling said oscillator, to cause said oscillator to produce an oscillation having phase and amplitude related to the gain characteristic of said last mentioned means to cause said modified brightness signal to correspond to an equal energy signal.

References Cited in the file of this patent

UNITED STATES PATENTS

| | | |
|---|---|---|
| 2,821,569 | Jones | Jan. 28, 1958 |
| 2,841,643 | Loughlin | July 1, 1958 |

OTHER REFERENCES

"Processing of the NTSC Color Signal for One-Gun Sequential Color Displays," B. D. Loughlin, Proceedings of the I.R.E., January 1954.